No. 770,060. PATENTED SEPT. 13, 1904.
C. FRICKE.
JAR CLOSURE.
APPLICATION FILED JUNE 29, 1903.
NO MODEL.

WITNESSES:
F. M. Burt.
J. J. Burt.

INVENTOR:
Charles Fricke
by Spear & Seely Attorneys.

No. 770,060.  Patented September 13, 1904.

UNITED STATES PATENT OFFICE.

CHARLES FRICKE, OF SAN FRANCISCO, CALIFORNIA.

JAR-CLOSURE.

SPECIFICATION forming part of Letters Patent No. 770,060, dated September 13, 1904.

Application filed June 29, 1903. Serial No. 163,583. (No model.)

*To all whom it may concern:*

Be it known that I, CHARLES FRICKE, a citizen of the United States, residing at San Francisco, in the county of San Francisco and State of California, have invented certain new and useful Improvements in Jar-Closures, of which the following is a specification.

My invention relates to closures for receptacles, such as jars, cans, &c.; and my object is to furnish a tight closure for such receptacles without employing gaskets or packing-rings of rubber or compositions liable to be affected by some kinds of canned or preserved materials.

My invention also has a special reference to screw-caps for jars, its construction and arrangement being such as to render the screw-cap easily removable without in any way diminishing the effectiveness of the closure.

Figure 1:
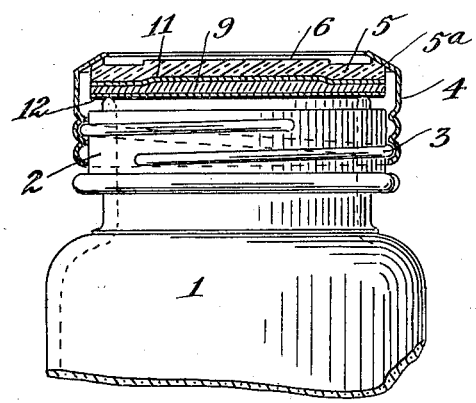
Figure 4:
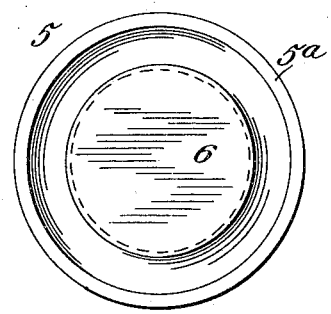
Figure 2:
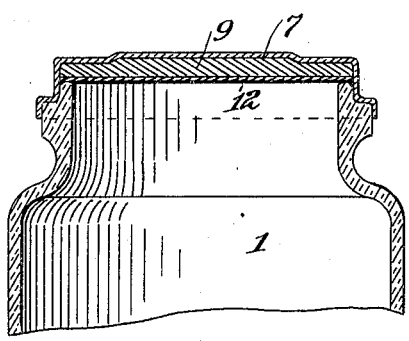
Figure 5:
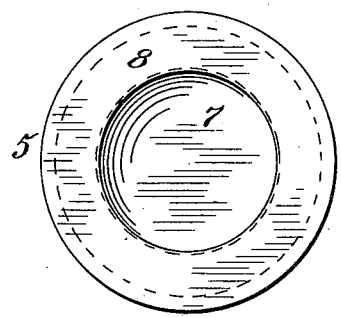
Figure 3:
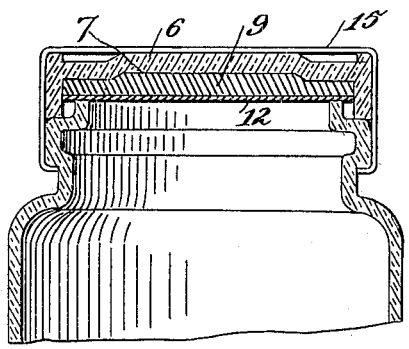
Figure 6:
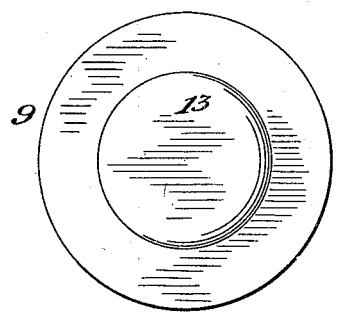

In the accompanying drawings, Figure 1 is a side elevation of a glass jar and a vertical section of a screw-closure. Fig. 2 is a vertical section of a glass jar with sheet-metal cap. Fig. 3 is a similar section of a glass jar with glass closure. Fig. 4 is a top plan of the glass pressure-disk of Fig. 1. Fig. 5 is a bottom plan of the same. Fig. 6 is a plan of the paper packing-disk.

In Fig. 1 the jar 1 has a neck 2, provided with the screw-thread 3 to receive the screw-cap 4. The glass disk 5 forms the closure, and in this instance it is provided on the upper face with the slightly-inclined rim $5^a$ and the central raised boss or disk 6. On the lower face it has a central depression 7, bounded by a narrow plane annular surface 8. Instead of compressing a rubber gasket between the glass cover and a ledge or seat on the jar I interpose between said cover and the rim and mouth of the jar a packing-disk which completely covers and closes the mouth. In making this disk I prefer to use one or more thicknesses of blotting-paper, such substance being easily compressible, and therefore capable of adapting itself to irregularities in the glass surfaces between which it is applied. In order to render such a packing-disk impervious to moisture, I cover one or both of its faces with a disk of some suitable material, and I prefer to use parchment-paper for such covering, the thin disk of parchment-paper being caused to adhere to the main body of the packing by any suitable adhesive means. In Fig. 1 the packing-disk is shown at 9 and the adhesive impervious surfaces of the same at 11 and 12. The packing-disk is formed in a suitable press, with a raised boss 13 upon one side which fits the central depression 7 of the main cover. If desired, it can be caused to adhere to the glass by the use of any suitable paste or cement, such as a simple paste of flour and water. This engagement of the boss 13 with the depression 7 locks the packing-disk to the glass cover, and though I do not consider the adhesion of the two to be absolutely essential I prefer to secure them together in the manner stated. When the parts are in place, the lower surface of the packing-disk bears upon the rim of the jar and is forced tightly against the same by the application of the screw-cap 4, which engages with the threads on the neck of the jar. The upper rim of this cap is turned inwardly, so as to bear upon the inclined rim $5^a$ of the glass cover. It will be noticed that the lower edge of the screw-cap is not caused to bear against a rib or flange on the jar, but that the compression is produced by the upper bearing between the parts 4 and $5^a$. This pressure clamps the packing-disk firmly above and upon the mouth of the jar, and as the material of which such disk is composed is compressible it adjusts itself to any inequalities in the glass. Where the lower edge of the screw-cap is not caused to bear and wedge against a seat or flange, the removal of the cap by unscrewing is much more easily accomplished, and hence this construction does away with one important objection which has always been found in the use of glass jars with screw-caps. This result is also contributed to by the fact that the rubber gasket has been eliminated, and the consequent friction between the cap and such gasket is done away with.

In Fig. 2 I have illustrated the application of my invention to a glass jar having a sheet-metal cap or cover. In this case the recess or depression 7 is formed in the central part of the sheet-metal cap, and the packing-disk is constructed in substantially the same manner as shown in Fig. 1, excepting that in Fig. 2 I have illustrated the impervious facing for such disk as applied to one side only.

In Fig. 3 I have illustrated a glass jar provided with a glass cover, which latter is provided with the raised boss 6 and the depression 7 and has the packing-disk constructed, arranged, and located in substantially the same position relatively to the other parts as have been previously described.

The invention is applicable either to vacuum-closures or to mechanically-clamped closure, and I have illustrated in Fig. 3 a clamp 15 applied to the closure for holding the cover tightly and putting the packing-ring under pressure. Such a clamp in itself is well known and forms no part of my invention; but I have found the raised boss 6 on the cover to be exceedingly advantageous when used with such a clamp, as it creates a strong and equal pressure at the proper point, which is the point or line of contact between the rim of the jar and the packing-disk.

The invention may be applied to other forms of receptacles in which a tight closure is required, and it is believed that the forms shown will be sufficiently illustrative of many others to which my invention is adapted.

Having thus fully described my invention, what I claim as new, and desire to secure by Letters Patent, is—

1. The combination with a receptacle, of a cover therefor, a packing-disk interposed between the cover and the rim of the receptacle, and an engaging recess and boss formed respectively in said cover and packing-disk.

2. The combination with a jar of a packing-disk overlying the mouth thereof, and having a raised central boss, a jar-cover having a recess on its lower surface to receive said boss, and means for applying pressure to the closure.

3. In combination, a jar having a threaded neck, a packing-disk closing the mouth of said jar, and provided with a central boss, a cover provided with a central depression, and a surrounding annular surface, the latter being above the rim of the jar, and a screw-cap for clamping the closure.

4. A packing-disk for jars, as a new article of manufacture, formed with a central boss upon its upper face, substantially as and for the purposes set forth.

5. In a closure, the combination with an open-mouthed receptacle of a cover therefor having a raised central portion and a relatively depressed surrounding annular portion; and a packing-disk of compressible material covering the mouth of the receptacle; the rim of the receptacle being below and in line with said depressed annular portion.

In testimony whereof I have affixed my signature, in presence of two witnesses, this 12th day of June, 1903.

CHARLES FRICKE.

Witnesses:
CHARLOTTE FRICKE,
L. W. SEELY.